United States Patent [19]

Trigon et al.

[11] Patent Number: 5,008,677
[45] Date of Patent: Apr. 16, 1991

[54] ANTI-JAMMING DEVICE FOR A RADAR PROVIDED WITH A REFLECTOR ANTENNA

[75] Inventors: Roland Trigon; Serge Drabowitch; Joseph Roger, all of Paris, France

[73] Assignee: Thomson-CSF, Paris, France

[21] Appl. No.: 816,280

[22] Filed: Jul. 7, 1977

[30] Foreign Application Priority Data

Jul. 13, 1976 [FR] France .............................. 76 21400

[51] Int. Cl.⁵ ........................... G01S 7/36; G01S 7/40
[52] U.S. Cl. .......................................... 342/17; 342/6; 342/173
[58] Field of Search ............. 343/18 E, 18 D, 100 LE; 342/6, 17, 173

[56] References Cited

U.S. PATENT DOCUMENTS 3,882,503 5/1975 Gamara ........................ 343/18 D X
4,070,675 1/1978 Daniel ........................... 343/100 LE

FOREIGN PATENT DOCUMENTS 1486902 9/1977 United Kingdom .............. 343/18 E

Primary Examiner—Thomas H. Tarcza
Assistant Examiner—Linda J. Wallace
Attorney, Agent, or Firm—Herbert Dubno

[57] ABSTRACT

A reflector of an antenna in a radar system subject to jamming carries a multiplicity of localized phase shifters which are sequentially controlled by a processor to introduce certain phase modifications into incoming signals reflected toward an associated radiator. The processor, operating on branched-off portions of the incoming signals, compares the magnitudes of the signals received in the several operational states of each phase shifter and maintains that operational state for which the signal level is at a minimum. The comparisons may be carried out on signals received at the end of a signal-transmission cycle, lacking a useful component.

12 Claims, 3 Drawing Sheets

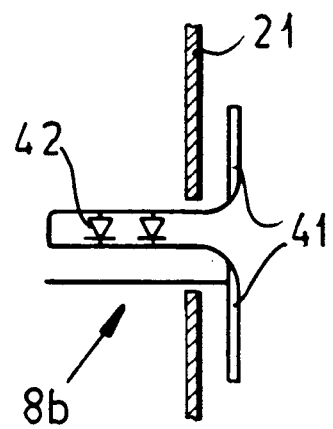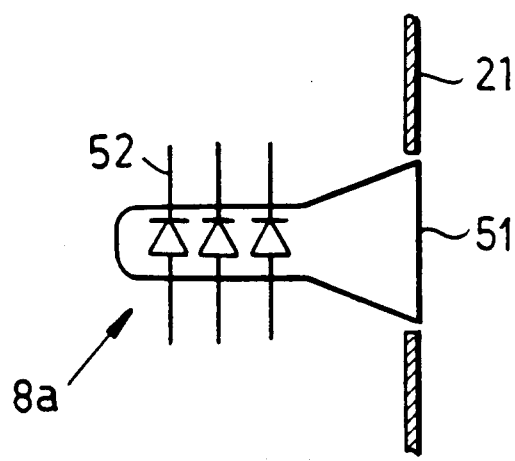
FIG.5  FIG.6
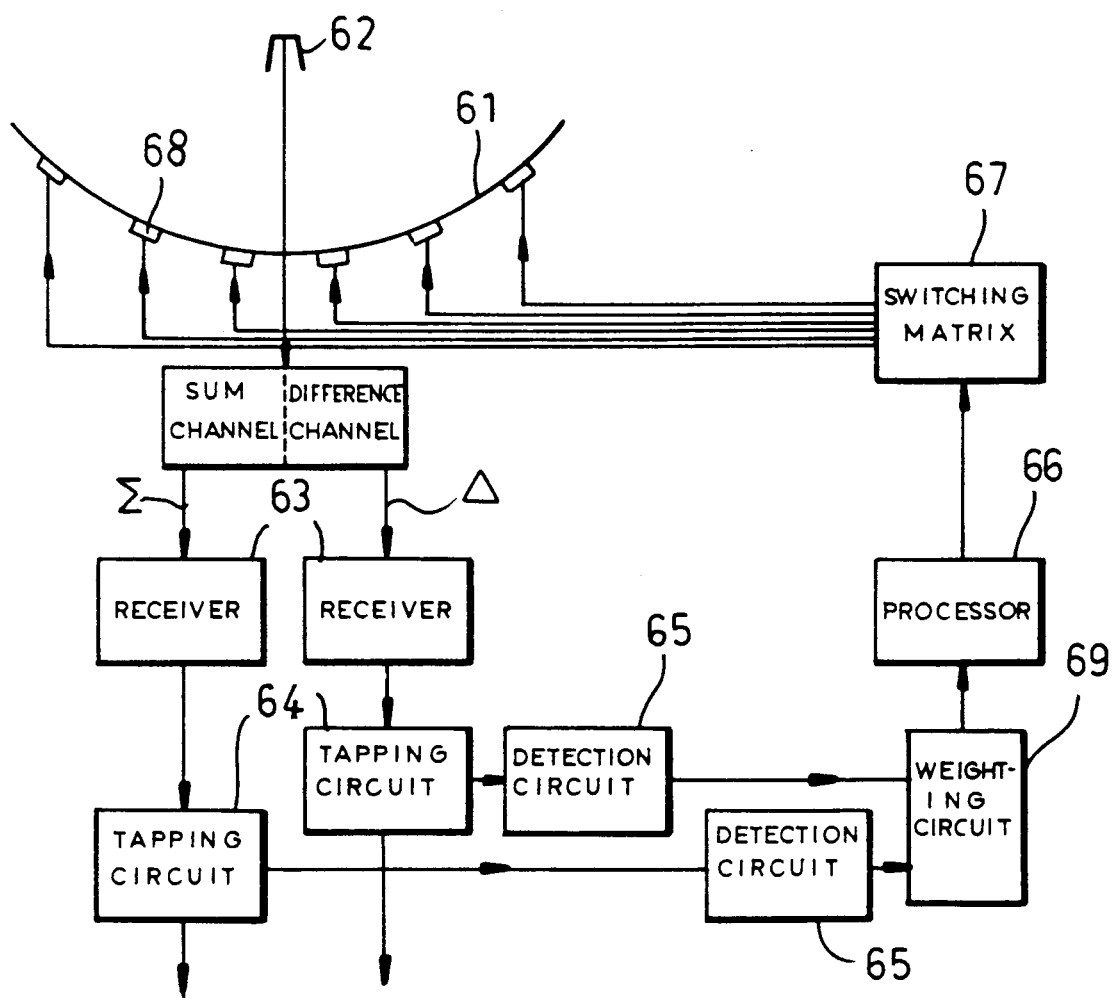
FIG.7

ANTI-JAMMING DEVICE FOR A RADAR PROVIDED WITH A REFLECTOR ANTENNA

FIELD OF THE INVENTION

The present invention concerns an anti-jamming device for electromagnetic detection equipment, i.e. a radar system, comprising an antenna with a reflector.

BACKGROUND OF THE INVENTION

It is known that various types of jammers can interfere with the operation of radar-type electromagnetic detection equipment. These jammers may be ground echoes, target images on the ground, or metallized strips known as chaff which are released in the operating zone of the radar in order to saturate the indicators thereof; active jammers are also encountered.

Generally speaking, the radioelectric signals emitted or reflected by these jammers are picked up by the side lobes of the antenna radiation diagram and may also affect the main lobe, albeit to a lesser degree. In the case of antennas with reflectors, the existence of side lobes is due in a large measure to the irregularity of the reflector surface, to the reflections of the signals emitted by close obstacles and to spillover of radiation from the primary source which is combined in classical fashion with the reflector.

The reception of external noises or jamming signals caused by the presence of such jammers is greatly attenuated in a known way if it is possible to produce zeroes for the radiation-diagram secondary lobes in previously unknown directions of the jammers.

A search for a reduction in the noise from an external source has been the subject of studies and designs in the technical field of sonar in particular. This reduction, which has been sought to be achieved by a modification of the amplitude or the phase of the emission consistent with the law concerning the energization of elementary radiating elements, has not, it seems, produced usable results in the case in particular in which the production of diagram zeroes is sought in unknown directions of the jammers.

OBJECT OF THE INVENTION

An object of the present invention is to obtain, for the reflector, a near-optimum phase law by modifying, at the chosen points in the structure of the reflector and/or its vicinity, the corresponding phase of the field of the signal reflected at these points.

SUMMARY OF THE INVENTION

In accordance with the invention, the radiation-diagram secondary-lobe zeroes in unknown directions of the jammers are obtained by sequential modification, at the chosen points in the structure of the reflector and/or its vicinity, of the corresponding phase of the field of the signal reflected at these points. For the reflector, this modification makes it possible to set up a near-optimum phase law for which the jamming energy is reduced or eliminated and which produces the best possible output signal level from a receiver combined with the antenna.

Thus, an anti-jamming device according to our invention comprises phase-modifying means closely juxtaposed with the reflector of the antenna for shifting the phases of signal waves reflected toward an associated radiator, the phase-modifying means being settable to a plurality of operational states introducing different phase shifts. A fraction of the intercepted wave energy is fed from the receiver to detector means generating test signals which are representative of that wave energy. A processor emits switching commands to the phase-modifying means for successively setting same in the several operational states thereof, the processor having input connections to the detector means for comparing the test signals generated in each of these operational states and for preserving a switching command which has been found to result in a minimum of intercepted wave energy.

Pursuant to a more particular feature of our invention, the phase-modifying means comprises a multiplicity of localized phase shifters which may be disposed on a reflector surface confronting the radiator and/or on the periphery of the reflector. The combined effective area of these phase shifters is substantially smaller than that of the aforementioned reflector surface.

The device according to our present invention is usable with advantage in the operation of monopulse tracking radars.

BRIEF DESCRIPTION OF THE DRAWINGS

The above and other features of our invention will now be described in detail with reference to the accompanying drawing in which:

FIGS. 3, 4, 5 and 6 show details of certain components of a device according to the present invention; and FIG. 7 is a diagram similar to FIG. 1 showing a device according invention in combination with a monopulse tracking radar.

SPECIFIC DESCRIPTION

Figure 1:
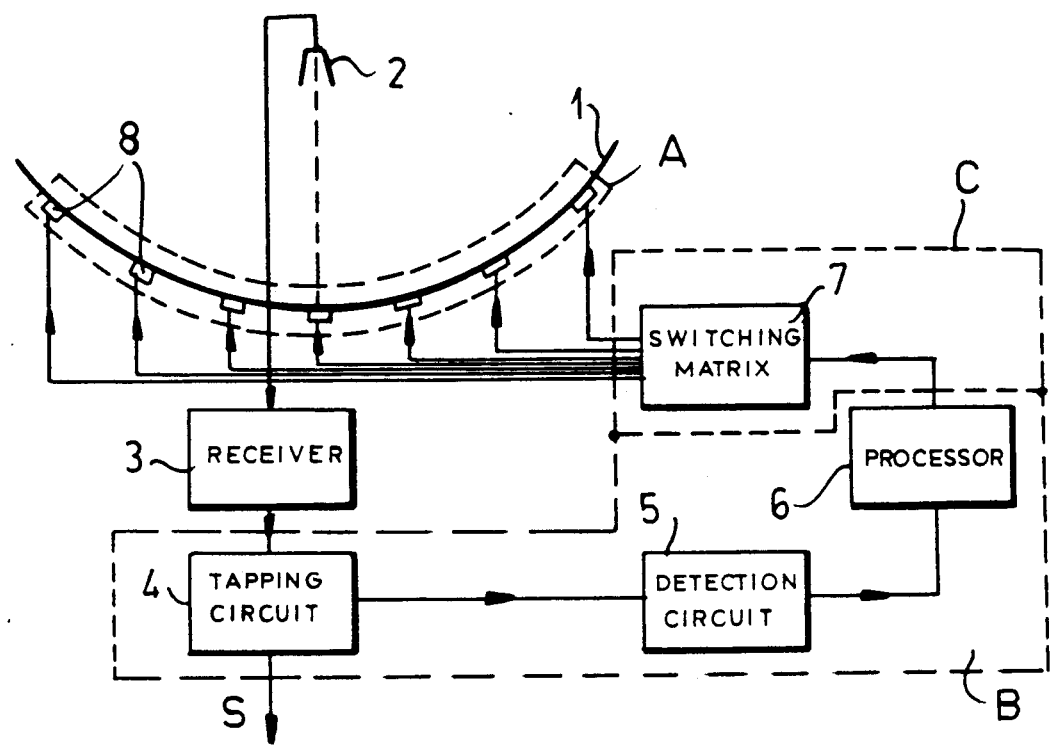
FIG. 1 shows a general diagram of a device embodying our invention.

In accordance with the diagram shown in FIG. 1, a device pursuant to our invention is associated with a reflector 1 and a primary source 2 together forming an antenna working into a receiver 3. According to the invention, the device comprises an array A for causing at several points, chosen in the vicinity of the reflector structure, a sequential modification in the phase of the field reflected at these points. The device further comprises circuitry B for comparing the magnitude of an output signal before and after modification of the phase at a chosen point, this circuitry being connected to the receiver output, and a discriminator C including a switching matrix 7 for maintaining the phase modification at the chosen points when the resultant output-signal level compared with the output-signal level before the phase shift at a chosen point is less than the latter. Circuitry B includes a circuit 4 for tapping the output signal S of the receiver 3 and delivering to a detection circuit 5 a fraction of the output-signal power. Detection circuit 5 contains a low-pass filter and delivers to an anti-jamming processor or computer 6 a video-frequency signal representing the mean power of output signal S. The processor is in turn connected through switching matrix 7 to the several dephasing elements 8 of array A distributed at chosen points in the structure of reflector 1.

In accordance with a particular feature of the invention, the circuit 4 for tapping the output signal S of receiver 3 may have a pick-up formed by a coupling loop or a branching point, consisting of a T-type junction for example, which makes it possible to extract a fraction of the power of the composite output signal formed by the useful signal and the jamming signal. In this case, a near-optimum phase law for the reflection is obtained when the magnitude of the composite or output signal is at a minimum.

Alternatively, the circuit 4 may be operated to extract a fraction of the energy of only the jamming signal appearing in the output of receiver 3. In this case the pick-up of tapping circuit 4 may be connected, for example, in series with a gate rendered conductive only at the end of a recurrence period when no radar signals are emitted so that the composite signal then received does not contain a useful component.

Sampling circuit 4 may also have its pick-up connected in series with a narrow-band filter centered on a zero in the spectrum of the useful signal. The jamming signal extracted in this case falls into the selected zero region of the spectrum.

Detection circuit 5 is formed by a conventional diode detector combined with a low-pass filter. The detector circuit delivers to processor 6 a video-frequency signal representing the mean power of output signal S.

Switching matrix 7 is formed, for example, by a set of diodes whose control and input terminals are connected to processor 6.

The device shown in FIG. 1 operates as follows: the signal picked up at the output of receiver 3 by tapping circuit 4 is passed to detector circuit 5 which then converts it into a video frequency test signal emits a series of phase-shifting commands in the presence of such a test signal. These command the initial frequency video signal. These phase change control signals are transmitted in succession and delivered respectively to the several dephasing elements by switching matrix 7 in accordance with a prearranged sequence corresponding to the disposition of the dephasing elements on the reflector structure.

Hence, for a given antenna aim direction, processor 6, for each phase modification at each of the phase-shifting points chosen on the reflector, compares the level of the video test signal representing the mean power of the output signal resulting from that phase modification with the level of the same signal before modification. The phase modification maintained for any dephasing element is the one which yields the lowest level of video-frequency signal for the given direction. The phase modification of some or all of the dephasing elements makes it possible to obtain an attenuation of the side lobes in the direction of the jammers without altering the characteristics of the main lobe of the radiation diagram. Local phase modifications at points of reflection affect weak fields, about the level of the secondary lobes, and do not appreciably upset the main lobe.

In the case in which, at each dephasing element, a phase modification by discrete values is used, e.g. a change from 0 to $2\pi$ in $\pi/2$ steps, for example, a successive testing of the four possible phase shifts of $\pi/2$, $\pi$, $3\pi/2$ and $2\pi$ enables the optimum shift, if any, to be found. In this case, in view of the amplitude of the phase variation which can be introduced by any dephasing element, only a small number of such elements (e.g. ten) is required to obtain a minimum level for the video signal fed to processor 6.

In any case, the number of dephasing elements designed to introduce a certain phase shift is related to the quality of the result desired and to the number of jammers to be eliminated. Successive tests in processor 6 of the different phase states of the various phase shifters 8 enables an optimum phase law to the obtained progressively for the reflector.

Instead of phase shifters adjustable over the full range of $2\pi$, as described above, we may use dephasing elements adapted to introduce a more limited phase shift of either sign. In this case, a sufficient number of dephasing elements are arranged at the reflector structure so that, in spite of the limited extent of the phase variation provided by any dephasing element, there is at least one setting for which a reduction or suppression of the video-frequency signal is obtained. In this case, successive tests by means of the processor of the algebraic value of the phase modification performed by each dephasing element also enable an optimum phase law to be obtained progressively for the reflector.

Figure 2:
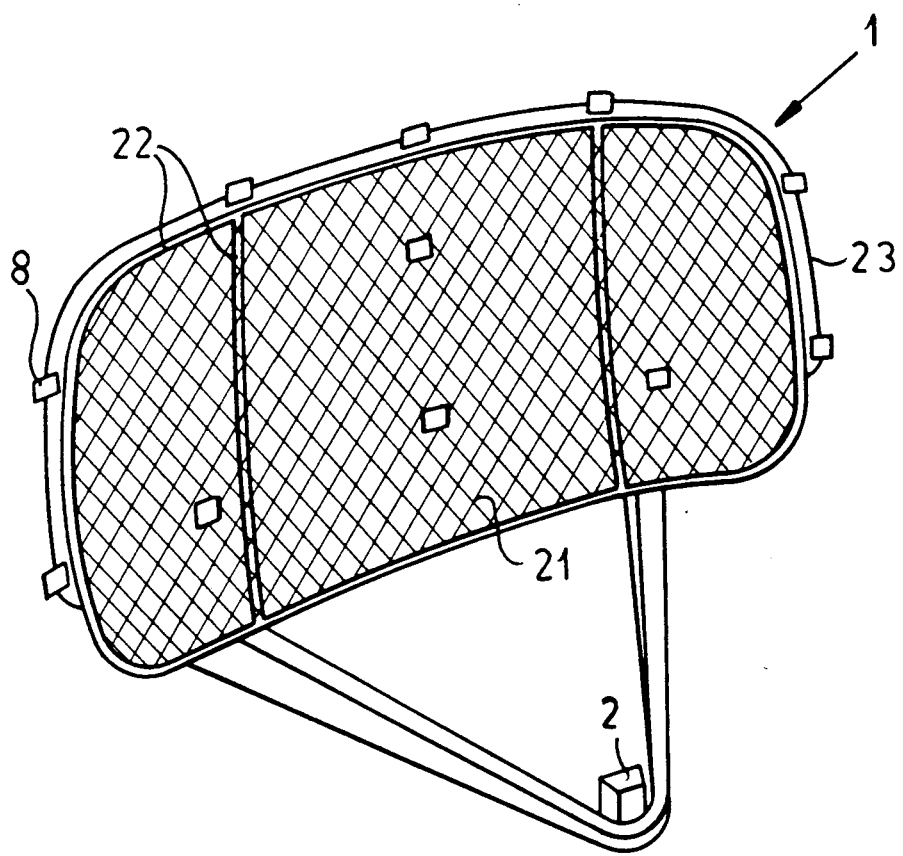
FIG. 2 shows a perspective view of the reflector of an antenna associated with the device of FIG. 1.

FIG. 2 shows a reflector 1 of the "orange skin" type. This reflector comprises a grid 21 held by metallic bars 22 forming its supporting structure. The dephasing elements 8 are lodged in holes made in the grid or mounted on the reflector periphery or rim overhanging the antenna 2. The dephasing elements of the latter group are fixed by metallic fastening lugs or rods 23 to the rear part of the antenna structure.

The dephasing elements are preferably mounted for the most part at the reflector periphery or antenna-overhang region in order that any disturbance of the characteristics of the main lobe be reduced to a minimum.

The dephasing elements arranged at the reflector surface are arbitrarily disposed at points located either in the zones in which the reflected field is intense or equally well in zones where the reflected field is weak, taking into account the reflector characteristics, a statistical study having shown that the quality of the result depends only on the number of dephasing elements used.

In the case in which the reflector surface is of metallized plastic material, the dephasing elements are placed in the same way in openings arranged in that surface or at its periphery.

Generally speaking, the dephasing elements, whose dimension is of the order of the wavelength of the signals transmitted by the antenna, are arranged on the reflector surface or in its immediate vicinity. In this way, the dephasing elements intercept a field whose radiation intensity in the jammer direction is equal to or less than that of the field which normally exists in this direction.

Figure 3:
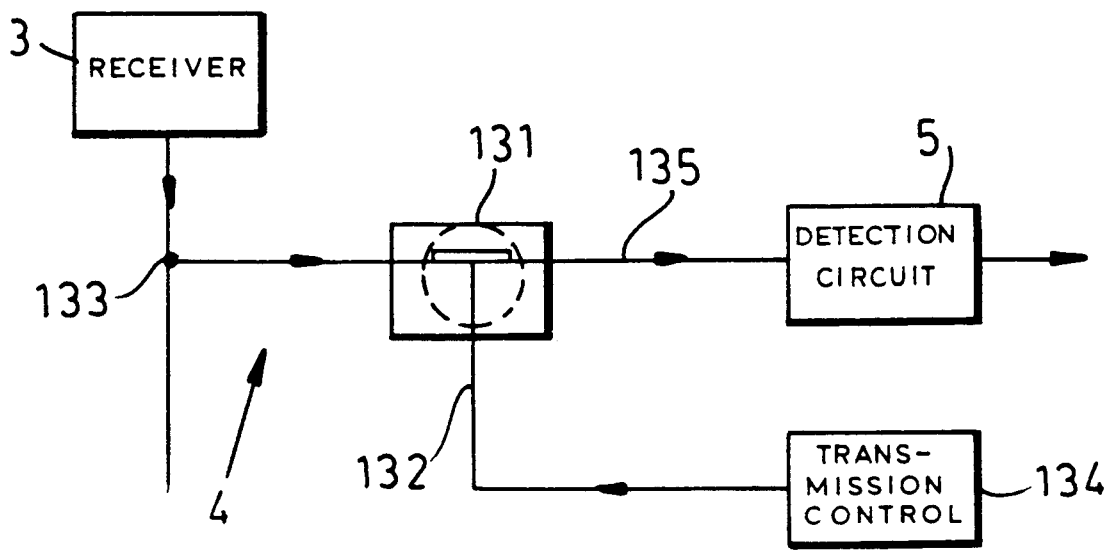

FIG. 3 shows a particular embodiment of the tapping circuit 4 containing a pick-up formed by a T-type junction 133 which is connected to a gate 131 whose control terminal 132 is connected to a timing circuit 134, controlling the signal-transmission cycle or recurrence period of the radar, which emits an unblocking pulse causing gate 131 to conduct at the end of each cycle, the output 135 of gate 131 being connected to detection circuit 5.

Figure 4:
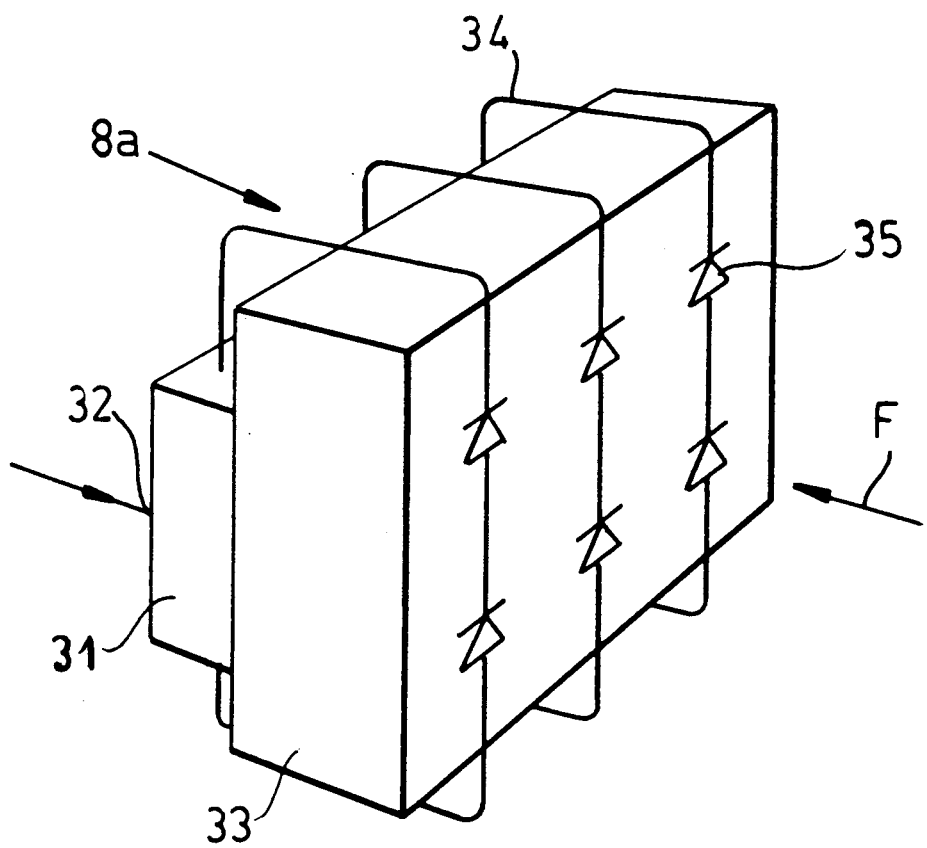

FIGS. 4, 5 and 6 show particular embodiments of dephasing elements in accordance with the invention.

In FIG. 4 a dephasing element 8a comprises a body 33 having a reflecting front surface confronting the radiator 2 of FIG. 1. This surface is overlain by several conductors 34 forming a wire network transverse to the direction of propagation of incident signals represented by an arrow F. Each wire containing one diode, or several diodes 35 connected in series, is connected to a control circuit 31 including means for biasing the diodes 35 into a conducting or a non-conducting state as required, depending on the phase-change commands delivered to an input 32 of control circuit 31 by the switching matrix 7 shown in FIG. 1. The body 33 of a dephasing element 31 is made reflecting or partially transparent by modifying the bias of its diodes 35. Depending on the transparency imparted to the corresponding dephasing element by the switching signals, the equivalent reflection plane of the signals changes its position with respect to the actual reflection plane of body 33 and the phase change undergone by the reflected signal field by the corresponding zone is modified. The mean position of the equivalent reflection plane corresponds to a zero phase modification of the reflected signal field at the corresponding phase-shifter zone.

FIGS. 5 and 6 illustrate two other forms of dephasing elements 8b, 8c. These are in the form of a dipole 41 or a horn 51 which may be short-circuited near its point of energization by diodes 42 (FIG. 5) or 52 (FIG. 6). Diodes 42 or 52 are connected to a control circuit, not shown, similar to circuit 31 of FIG. 4. The dipole or horn forming the dephasing element is housed in a hole of the reflector surface formed, for example, by grid 21 or the reflector periphery as described with reference to FIG. 2.

More generally, and without surpassing the scope of the present invention, the dephasing elements may be formed by any device able to supply a reflection coefficient of modulus 1 and phase switchable among at least two values.

In FIG. 7 we have shown an the particular embodiment of the present invention in combination with a monopulse tracking radar. The latter comprises a reflector 61 combined with a primary source 62 to form the antenna. This reflector 61 is fitted with dephasing elements 68 distributed on its surface or at its periphery. Source 62 is a monopulse radiator and feeds the sum $\Sigma$ and difference $\Delta$ reception channels including respective receivers 63. A fraction of the power of the output signal of each sum and difference channel is extracted by a respective tapping circuit 64 and fed to a processor 66 at the end of a recurrence period, thus in the absence of reflected radar pulses so that the phase-shifting operations of the dephasing elements 68 and the jamming-signal evaluations are performed in the absence of a useful signal. These operations may be repeated during the following cycles until the minimum jamming-signal level is obtained. Circuits 65 carry out detection and filtering of the signals received through each channel.

The tapping circuits 64 each comprise, as previously described, a coupling loops or other types of pick-up connected in series with a switch closing at the end of each recurrence period. Detection circuits 65 may each consist of a conventional diode network which delivers, through a low-pass filter, a video-frequency signal representing the average power of the jamming signal for each channel.

Circuits 65 are connected to a weighting circuit 69 which derives from the incoming video-frequency signal an error signal representing the magnitude of the jamming signal. The processor 66 connected to the output of weighting circuit 69 controls through a switching matrix 67, in response to the error signal, the sequential phase-shifting operations of the dephasing elements 68 distributed on the reflector structure, the comparison of the levels of the error signal delivered by the weighting circuit before and after the emission of each phase-modification instruction, and the preservation of the corresponding phase modification when the error-signal level is less after the phase shift than before.

Generally speaking, processor 66 may consist of a computer containing means for comparing the levels of the video-frequency signal derived from the receiver output, or for comparing the error signals delivered by weighting circuit 69, and decision means for preserving the phase-shift command which results in the minimum signal level.

What is claimed is:

1. In a radar system subject to jamming, provided with an antenna including a primary radiator and a reflector juxtaposed therewith for directing incoming wave energy to said radiator, the latter having an output connection to a signal receiver,
   the combination therewith of an anti-jamming device comprising:
   phase-modifying means closely juxtaposed with said reflector for shifting the phases of signal waves reflected toward said radiator, said phase-modifying means being settable to a plurality of operational states introducing different phase shifts;
   detector means connected to said receiver for generating test signals representative of incoming wave energy intercepted by the reflector; and
   processing means for emitting switching commands to said phase-modifying means successively setting same in each of said operational states, said processing means being connected to said detector means for comparing the test signals generated in each of said operational states and for preserving a switching command found to result in a minimum of intercepted wave energy.

2. The combination defined in claim 1 wherein said phase-modifying means comprises a multiplicity of localized phase shifters with a combined effective area substantially smaller than that of the reflector.

3. The combination defined in claim 2 wherein each of said phase shifters comprises a conductor element provided with a plurality of diodes for selectively short-circuiting certain portions of said element.

4. The combination defined in claim 3 wherein said conductor element is a dipole.

5. The combination defined in claim 3 wherein said conductor element is a horn.

6. The combination defined in claim 2 wherein at least some of said phase shifters are disposed in openings on a surface of said reflector confronting said radiator.

7. The combination defined in claim 2 wherein at least some of said phase shifters are disposed on the periphery of said reflector.

8. The combination defined in claim 2 wherein each of said phase shifters comprises a body with a reflecting surface confronting said radiator, said surface being overlain by a set of conductors in series with respective diode means, and a control circuit connected to said conductors.

9. The combination defined in claim 2 wherein each of said phase shifters is adjustable in discrete steps over a range of $2\pi$.

10. The combination defined in claim 1 wherein said receiver has an output including coupling means for delivering a fraction of the incoming wave energy to said detector means.

11. The combination defined in claim 10, further comprising gating means in series with said coupling means responsive to pulses from a timing circuit, controlling the transmission of outgoing radar signals, for passing said fraction of incoming wave energy to said detector means only at the end of a signal-transmission cycle, in the absence of a useful signal component intercepted by said reflector.

12. The combination defined in claim 1 wherein said receiver has two sections respectively included in a sum channel and a difference channel originating at said radiator, said detector means being duplicated in said channels, said processor having input connections including a weighting circuit common to both channels.

* * * * *